United States Patent [19]

Anton et al.

[11] Patent Number: 4,994,506
[45] Date of Patent: Feb. 19, 1991

[54] BRAKE LININGS

[75] Inventors: Octavian Anton, Brussels, Belgium; Alfred Eckert, Wachtersbach; Armin Eckert, Waltrop, both of Fed. Rep. of Germany

[73] Assignee: Redco N.V., Fed. Rep. of Germany

[21] Appl. No.: 399,838

[22] Filed: Aug. 31, 1989

[51] Int. Cl.$^5$ .................................. C08K 3/34
[52] U.S. Cl. ............................. 523/155; 523/156; 524/456
[58] Field of Search ............... 523/155, 156; 524/456

[56] References Cited

U.S. PATENT DOCUMENTS

| 4,101,500 | 7/1978 | Brodsky | 523/159 |
| 4,313,869 | 2/1982 | Littlefield | 523/158 |
| 4,363,884 | 12/1982 | Ogiwara | 523/155 |

FOREIGN PATENT DOCUMENTS 56-107053  8/1981  Japan .................. 523/156

OTHER PUBLICATIONS

A. A. Hodgson, "Alternatives to Asbestos and Asbestos Products", 1987, pp. 224–227.
Promat, "Promaxon®-A Synthetic Calcium Silicate With Unique Properties", Sep. 1988.

Primary Examiner—Lewis T. Jacobs
Attorney, Agent, or Firm—Wegner, Cantor, Mueller & Player

[57] ABSTRACT

Asbestos-free brake lining comprising phenolic resin and usual fillers and in addition an amount of a synthetic hydrated calcium silicate particle of xonotlite with a substantially spherical morphology and a mean diameter of 50 to 70 µm with an open inner structure and an outer shell with a close limited crystal structure with pore openings of up to $10^{-7}$ m in the outer shell.

5 Claims, No Drawings

BRAKE LININGS

This invention relates to brake linings, more specifically asbestos-free brake linings with improved properties.

Brake linings comprise conventionally a phenolic resin and several usual fillers. These usual fillers are for example graphite, carbonaceous materials, rubber particles, barium sulfate, silicas, aluminum oxide, clays, calcium carbonate, steel fiber, brass, aluminum, zinc in the form of fibers, chips, wool, copper powder, sponge iron, aramide fiber, calcium sulfate whiskers, and similar products. Usually the brake linings comprise several of these fillers but not necessarily all of them. Originally most of the brake linings contained in addition asbestos, whereas in the meantime asbestos free brake linings were also developed, although their properties are mostly inferior to those containing asbestos.

Brake linings, like other friction products have to fulfill several demands. The most important demands relate to friction, temperature resistance, wear rate, fade and recovery, intrinsic strength, noise and thermal conductivity.

Friction: The parameter is a coefficient of friction which varies from about 0.3 in many of these products to 0.5 for heavy duty brake linings. The coefficient of friction decreases with both increasing unit pressure and sliding speed between the mating surfaces, and the design of braking equipment must take this into account for any given type of friction product. It varies unpredictably as temperature increases and may fall dramatically at very high temperatures of operation.

Temperature resistance: Fade free maximum operating temperatures are

| for, | drum linings and dry plate clutches | 250° C. |
|---|---|---|
| | passenger vehicle disc pads | 300° C. |
| | heavy duty linings, pads and blocks | 350° C. |
| | semi-metallic friction products | 400° C. |

For purpose of comparison, normal operation of brakes in passenger cars generate temperatures in the range of 150° C. to 250° C., while in large aircraft the range is 400° C. to 600° C.

Wear rate: Under normal operating conditions this remains almost constant, but at drum or disc temperatures above 200° C., wear of organic bonded products increases exponentially. Wear life is not necessarily dependent on the hardness of the lining or pad. Apart from the more obvious causes of wear, such as ploughing of linings by hard particles, or high temperature melting or oxidation, adhesion of the friction element and the rotating part of the brake can take place, with fragments of the friction element subsequently breaking away.

Fade and recovery: Under circumstances of frequent or continual braking, where high temperatures are generated, the coefficient of friction falls and the brakes fade. Recovery from fade takes place as the brakes cool. These characteristics are highly important in the formulation of friction elements and in the design of rotor ventilation, as in the discs of racing cars.

Intrinsic strength: All types of friction elements must withstand considerable tensile and shear forces in the course of their operation. In resin based materials the intrinsic strength of the element depends on the reinforcing efficiency of fiber or other materials used in the composite. In cermets and carbon-carbon composites strength depends on the cohesive forces between the various components.

Noise: Some types of linings and pads possess a distinct noise factor, due to modifiers which may be included in the formulation or due to the exclusion of noise modifiers which may interfere with other properties.

Thermal conductivity: As far as it is practical, the thermal conductivity of friction elements must be minimal, to avoid overheating of the hydraulic mechanism and brake fluid of the braking system. Semi-metallic elements are often designed with a backing of a asbestos based composite to reduce the effect of heat conduction.

The object of this invention is to provide asbestos-free brake linings with good, reliable and improved properties compared to those of the prior art.

A further object of this invention are brake linings with less fading, better recovery, less noise and thermal conductivity.

Other objects and advantages of the invention will be apparent from the description hereinafter following.

SUMMARY OF THE INVENTION

It has now been discovered that in brake linings an additional amount of 3 to 25% by weight, preferably 5 to 20% by weight of synthetic hydrated calcium silicate particles of xonotlite with a substantially spherical morphology and a mean diameter of 50 to 70 $\mu$m with an open inner structure and an outer shell with a close limited crystal structure with pore openings of up to $10^{-7}$ m in the outer shell have such improved properties. Such brake linings especially have less fading, better recovery, less noise and thermal conductivity.

DETAILED DESCRIPTION OF THE INVENTION

The asbestos-free brake linings according to the invention comprise usually phenolic resin and the conventionally used fillers of the group including graphite, carbonaceous materials, rubber particles, barium sulfate, silicas, aluminum oxide, clays, calcium carbonate, steel fiber, brass, aluminum, zinc in the form of fibers, chips, wool, copper powder, sponge iron, aramide fiber, calcium sulfate whiskers and other usually used fillers. The brake linings contain at least some of them, but not necessarily all of them, depending on the purpose of the brake lining and the specific demand on it.

It has been found that especially asbestos-free brake linings can be improved in many aspects and, depending on the other components, at least in one or two aspects if they contain an additional amount of 3 to 30% by weight, preferably 5 to 25% by weight, of synthetic hydrated calcium silicate particles of xonotlite with a substantially spherical morphology and a mean diameter of 50 to 70 $\mu$m with an open inner structure and an outer shell with a close limited crystal structure with pore openings of up to $10^{-7}$ m in the outer shell.

These materials are commercially available, for example, under the trade mark Promaxon$^R$ by the Promat B.V., Hilversum, Holland.

These synthetic calcium silicates have unique properties. They are used for example in paints and coatings improving the stability and the viscosity versus time. They stabilized the rheologic properties of epoxy resin systems during storage and during hardening. But now it was found that this product also can be used to improve the properties of brake linings. Besides the rheological and good mechanical characteristics of the composite, the particular crystallochemical structure gives unique effects of cooling during braking. This has been mentioned publicly for the first time in advertising material of Promat B.V. in September 1988. In the meantime there were achieved reproducible results of measurements with several different compositions for brake linings confirming the surprising good results.

Besides excellent properties during handling composites for making the brake linings, the brake linings according to the present invention show especially good and improved properties with respect to less fading, better recovery, less noise and less thermal conductivity.

The brake linings according to the present invention furthermore can be varied and modified in the usual way by the usual property modifiers. Their functions are complex, as the following summary indicates:

| | |
|---|---|
| friction modifiers | cashew nut resin and dust. |
| friction control | carbonaceous materials. |
| abrasive modifiers | alumina, kyanite (less than 75 μm particle size) |
| wear control | rubber particles, carbonaceous materials; ground limestone, barytes, clays, finely divided silicas. |
| noise control control of recovery after fade | rubber particles, carbonaceous materials. zinc chips, aluminium chips. |
| for scavenging of surface films | brass chips, copper powder. |

Some of these modifiers have a dual function and some have apparently opposing effects. For example inorganic materials contribute to noise, but improve wear at minimum cost, and require to be balanced by other modifiers which reduce noise. Nevertheless, all these materials contribute in one way or another to the performance of the finished product.

Brake linings are all made by the same basic three stage process. The primary and probably most fundamental stage consists in the mixing of the components. This is by no means simple, since the formulations include fibers, powders, particulates of differing densities and sticky uncured resin particles, and all these must be brought into intimate mixture in the dry state. The mixing operation takes place in multipaddle mixers, having a recirculatory action.

In the second stage the friction elements are preformed. Weighed portions of the premix are spread in the cavities of a press mold and preformed under high pressure and at temperatures generally not exceeding 150° C. The preforming period lasts for 5 to 30 minutes, depending on the type of product and resins employed.

Lastly the preforms, in the shape of the finished product and in a green but handlable stage, are removed from the press, stacked in trays and then cured in ovens at temperatures between 180° C. and 300° C. for a number of hours. Again the period of cure and the temperature of cure both depend on the type of product being made.

All these products require a final stage of finishing. Brake linings are face ground to specified radii and chamfered. Linings also require precise and clean countersunk drill holes to carry the rivets by which they are attached to their backing plates.

Essentially manufacturers have two options in attempting to develop non-asbestos friction products. Either they replace the asbestos in conventional organic linings by other materials or they aim for a completely new concept of product embodying a different range of raw materials. The latter concept has been achieved in certain areas with the introduction of carbon composites which have replaced asbestos based products solely on the grounds of high performance and high temperature requirements.

The replacement of asbestos in conventional brake linings raises a number of constraints both in choice of material and performance of the product. Aramide, steel, glass and alumino-silicate fibers are favored together with modifiers or back-up materials such as cellulose, mica, attapulgite, wollastonite, diatomaceous earth and non-fibrous serpentine.

The advantages and disadvantages of alternatives to asbestos in friction products are compiled in the following Table I:

TABLE I

| Material | Advantages | Disadvantages |
|---|---|---|
| Glass fiber | good reinforcing properties. | temperature limits 250° C., to 400° C. poor wear resistance, erratic friction, rotor wear, fibers clump together in mixing processes, fibers cause spring back in pre-forming process. |
| Alumino-silicates | good reinforcing properties, very high temperature resistance. | poor wear resistance, abrasive, mixing and processing problems as for glass fiber. |
| Mica | good friction. | poor reinforcement, surface tear out, rotor wear. |
| Wollastonite | good reinforcing properties, low wear. | rotor wear, surface tear out, in stop fade. |
| Steel fibers | good reinforcing properties, good temperature resistance. | high density, corrosion, noise, high thermal conductivity, fibers clump together in mixing process, fibers cause spring back in pre-forming process. |
| Aramid fibers | very good reinforcing properties, low wear rate, low density. | temperature limits 200 to 350° C., mixing and machining problems, less suitable in linings. |
| Other synthetic | good reinforcing | low melting point. |

TABLE I-continued

| Material | Advantages | Disadvantages |
| --- | --- | --- |
| organic fibers | properties. | |
| Carbon fibers | very good reinforcing thermal stability. | mixing problems, high cost. |
| Semi-metallic products | good all round performance in heavy duty applications. | suitable for disc pads only, cannot be formed as linings, high thermal conductivity, noise. |
| Carbon composites | high temperature, high performance properties. | less suited to motor vehicle use in present form, unless diluted with glass or steel fibers. |
| Cermets | high temperature, high performance products. | not suited to motor vehicle use. |

It was found that use of Promaxon$^R$, that is synthetic hydrated calcium silicate particles of xonotlite with a substantially spherical morphology and a mean diameter of 50 to 70 μm with an open inner structure and an outer shell with a close limited crystal structure with pore openings of up to $10^{-7}$ m in the outer shell in brake linings, leads to the following results:

1. Preparation of mixture:

An addition of Promaxon$^R$ is very helpful for homogeneity, good dispersion of all components and prevents segregation during the handling of the mixtures.

2. Formed products:

Significant increase of green strength, which is also very advantageous.

3. Finished products:

An addition of Promaxon$^R$ increases mechanical strength, especially the flexural strength. Furthermore, it improves the fade resistance and the friction characteristic stability. The improved hardness is an advantage with respect to cleaning, because less dust is produced and released in the brakes and to the environment. The decreased thermal conductivity improves characteristics at high temperatures and therefore contributes to a lower increase of temperature of the other parts of the brake.

Preferred embodiments of the invention are described in the following examples which, however, are not intended to limit the scope of the invention.

EXAMPLE 1

A standard composition of the asbestos-free brake lining which contains aramide pulp, barium sulfate, aluminum oxide, steel wool, graphite, phenolic resin and calcium carbonate is shown in mixture I. The content of calcium carbonate was decreased and replaced more or less by the synthetic xonotlite (Promaxon$^R$ used according to the invention). These new mixtures are designated II to VI. All these compositions are described in the following Table II.

tion value code of all 6 mixtures was substantially the same. The friction value at increased temperatures of usual use was substantially the same in Mixtures I to IV but increased in Mixture V and VI by 5 to 10%. The fading test, however, showed that Mixtures V to VI had significantly better results than Mixture I. It further was observed that Mixtures II to VI gave less noise than Mixture I. Measurement of temperature of the drum further indicated that the increase in temperature took place later. That means that the brake linings according to Mixtures II to VI had a lower thermal conductivity.

EXAMPLE 2

Other usual compositions for asbestos-free brake linings were modified by adding a synthetic xonotlite (Promaxon$^R$) as the additional filler and by partially replacing other fillers. The production of brake linings from these compositions was observed to be easier and less sensitive with respect to demixing during handling of the mixture. Furthermore, it was observed that they had an improved green strength before curing. The final products were compared with the products without Promaxon$^R$ and were observed to be of at least similar, in many aspects improved, properties especially with respect to less fading, better recovery, less noise, and decrease of thermal conductivity.

We claim:

1. Asbestos-free brake lining comprising phenolic resin, fillers, and an amount of 3 to 25% by weight of synthetic hydrated calcium silicate particles of xonotlite with a substantially spherical morphology and a mean diameter of 50 to 70 μwith an open inner structure and an outer shell with a close limited crystal structure with pore openings of up to $10^{-7}$ m in the outer shell.

2. Asbestos-free brake lining according to claim 1, wherein the amount of synthetic hydrated calcium silicate particles of xonotlite is 5 to 20% by weight.

3. Asbestos-free brake lining according to claim 1,

TABLE II

| | Mixture I (%) | Mixture II (%) | Mixture III (%) | Mixture IV (%) | Mixture V (%) | Mixture VI (%) |
| --- | --- | --- | --- | --- | --- | --- |
| Aramid pulp | 1.00 | 1.00 | 1.00 | 1.00 | 1.00 | 1.00 |
| Barium sulfate | 15.00 | 15.00 | 15.00 | 15.00 | 15.00 | 15.00 |
| Aluminium oxide | 5.00 | 5.00 | 5.00 | 5.00 | 5.00 | 5.00 |
| Steel wool | 29.00 | 29.00 | 29.00 | 29.00 | 29.00 | 29.00 |
| Graphite | 18.00 | 18.00 | 18.00 | 18.00 | 18.00 | 18.00 |
| Phenolic resin | 7.00 | 7.00 | 7.00 | 7.00 | 7.00 | 7.00 |
| Calcium carbonate | 25.00 | 20.00 | 15.00 | 10.00 | 5.00 | — |
| Promaxon$^R$ D | — | 5.00 | 10.00 | 15.00 | 20.00 | 25.00 |

Brake linings were produced from these mixtures and tested according to standard tests used in the brake lining industry. The results were as follows: The fricwherein the fillers are selected from the group consisting of carbonaceous materials, barium sulfate, silica, aluminum oxide, clays, calcium carbonate, steel fibers, brass chips, aluminum chips, zinc fibers, zinc chips, copper powder, sponge iron and calcium sulfate whiskers.

4. Asbestos-free brake lining according to claim 3, wherein the carbonaceous materials are selected from the group consisting of graphite, rubber particles and aramid fibers.

5. Asbestos-free brake lining according to claim 1, wherein the fillers are selected from the group consisting of friction modifiers, friction control fillers, abrasive modifiers, wear control fillers, noise control fillers, control of recovery after fade fillers, and surface film scavenging fillers.

* * * * *